3,009,099
TESTING INSTRUMENT FOR ELECTRIC ALTERNATING VOLTAGES

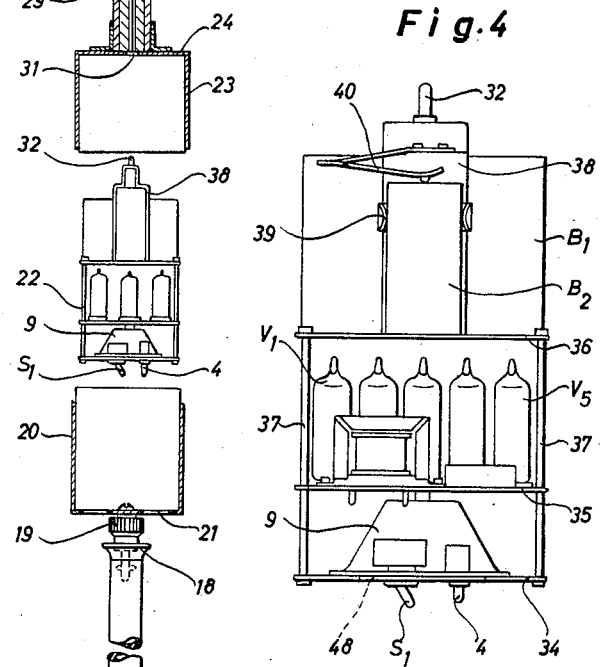

Otto Müller, Nurnberg, Germany, assignor to Alois Schiffmann, Dipl.-Kaufmann, Munich, Germany
Filed Apr. 29, 1958, Ser. No. 731,673
Claims priority, application Germany May 9, 1957
7 Claims. (Cl. 324—52)

The present invention relates to a testing instrument for electrical alternating voltages, particularly for high voltages.

An important object of the present invention is to provide means facilitating without any danger to the operator to accurately and absolutely reliably test conductors leading high voltage currents.

A further object of the invention is to provide means affording the manufacture of such testing instrument which is capable of testing several conductors disposed adjacent each other in predetermined succession and of varying voltages.

A further object of the invention is to provide means, ensuring testing operation also in closed spaces, e.g. power distribution stations, in which disturbing noises, such as the humming of the machines, the singing of fast running dynamos and similar devices, prevail.

A further object of the invention is to provide means conductive to testing instrument structures, which permit use thereof even in case of poor illumination conditions or at glaring or bright sunlight.

Other objects and advantages will be apparent from a consideration of the annexed drawings, specification and claims.

In the drawings:

FIG. 3 is a lateral view of the instrument, whereby the parts are shown in a partially exploded view and wherein the scanning head of the instrument is illustrated in section, and FIG. 4 is a side-view of the main part of the instrument, drawn to a larger scale than in FIG. 3.

Figure 1:
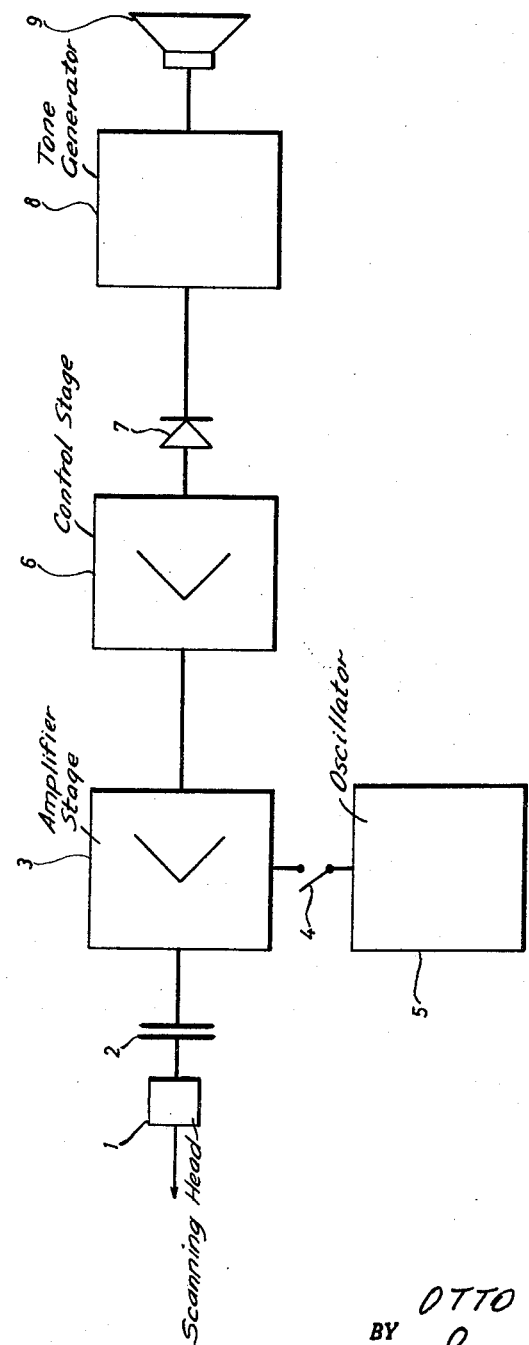
FIG. 1 is a schematic block diagram illustrating the general construction of the electrical parts of the instrument embodying the invention.

The gentral design of the instrument is shown in FIG. 1. It has a scanning head 1 connected to a capacitor 2. The capacitor 2 is connected to an amplifier stage 3, which, in addition, can be connected, by a test key 4 with an oscillator stage 5 for control purposes. The voltage amplified in the amplifier stage 3 is fed to a control stage 6 which excites, together with a rectifier 7, a tone generator 8. At the output of the tone generator 8 a loudspeaker 9 is arranged, whose sound strength can be regulated.

The manner in which the instrument functions is as follows: The scanning head 1 is brought into direct electrical contact with the line to be tested. Thus a voltage divider is created through the capacitor 2, the amplifier stage 3 and the body of the operator, which divider can be made so that transverse current thus created is absolutely safe for the operator. The potential applied to the input of the amplifier 3 is, however, sufficient to modulate the control stage 6 after amplification in an amplifier stage. The control stage 6 comprises an amplifier stage and rectifier member connected with each other in such a way that, according to the desired exciting of the tone generator 8, sufficient voltage or power for a perfect excitation of this stage is present. The loudspeaker 9 is either connected directly to the output of the tone generator or across the amplifier and regulator members. The design of the tone generator 8, which corresponds either to a generally known oscillation stage or to a scanning oscillator or other known similar means permits the generation of one or several tones, which are variable over the complete audible frequency range.

Before and after the checking of the voltage, a check of the instrument is made by applying an A.C. voltage to the input of the amplifier 3, this voltage being generated in the oscillator stage 5 and is of a maximum value at least equal to the voltage to be applied to the scanning head 1. The test key or switch 4 can either separate the oscillating stage 5 or it can be used for exciting the oscillating stage 5.

The complete device is fed by batteries in order to be independent from the normal network voltage. The amplifier stages as well as the control stages and the generators can, of course, be provided either with electronic valves or with transistors. It is furthermore possible to unite amplifiers and control stages (double function valves) or to use gas-filled valve types.

Figure 2:
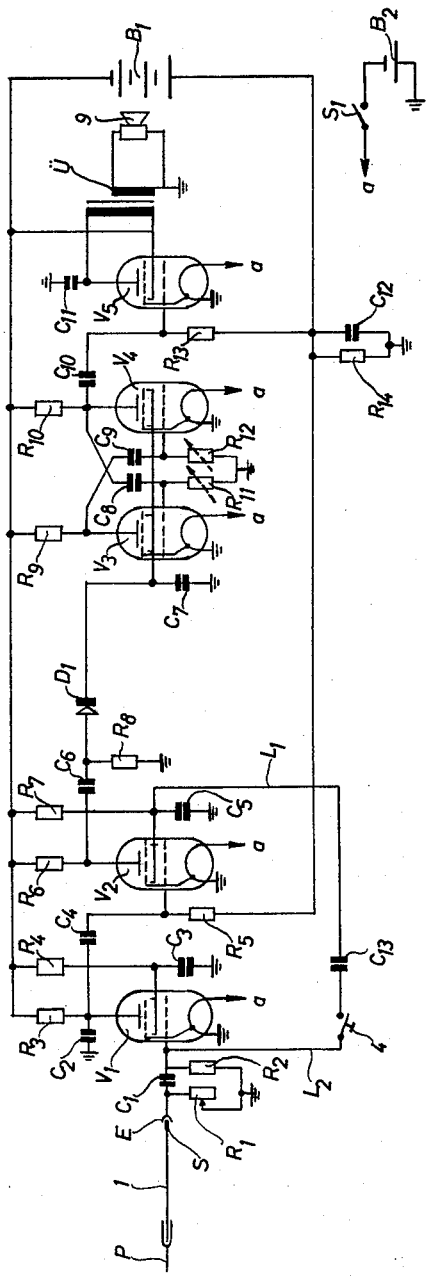
FIG. 2 is a schematic wiring diagram of the testing instrument of FIG. 1.

In FIG. 2 a preferred example is shown in detail which elucidates the arrangement and wiring of the instrument.

As directly heated valves, battery valves $V_1$, $V_2$, $V_3$, $V_4$ and $V_5$ are used, which receive their anode voltage from a 75-volt dry cell battery $B_1$ and their heating voltage from a 1.5-volt dry cell battery or accumulator $B_2$.

The test electrode P of the scanning head 1 is to be brought into direct contact with a conductor or the like (not shown) having a high A.C. voltage which is to be tested. The scanning head 1, containing a capacitor of very low capacity, is connected with the input terminal E of the testing instrument by means of a plug connection S.

The input terminal E of the instrument is connected to the screen grid of the first amplifier valve $V_1$ through a capacitor $C_1$. A part of the tapped A.C. voltage is impressed across a resistance $R_2$, and an adjustable resistance $R_1$ is connected in parallel with the capacitor $C_1$ and the resistor $R_2$ and serves for regulation of the sensitivity of the instrument, the resistance $R_1$ being fixed after adjustment.

The valve $V_1$ amplifies the partial network A.C. voltage to be tested, and the amplified voltage is impressed across the anode resistor $R_3$. This valve is a pentode and is connected in a known manner as an amplifier. The screen grid is connected through a resistance $R_4$ to the positive terminal of the anode battery, and is connected to ground across a capacitor $C_3$. The amplified voltage impressed across the anode resistor $R_3$ is applied through the coupling capacitor $C_4$ to the control grid of the next valve $V_2$.

The capacitor $C_2$ in the anode circuit of the valve $V_1$ assures that only frequencies up to about 2000 c.p.s. are amplified. It is dimensioned in such a way that higher frequencies are short-circuited. By this means, only the network frequency voltages are amplified. They generally have a frequency of 16⅔ c.p.s., 50 or 60 c.p.s. Interference frequencies, which could lead to an erroneous indication of the instrument, are thus eliminated.

The valve $V_2$, which is likewise a pentode, forms the second amplifier stage and is again connected in known manner.

The grid bias for this valve and the valve $V_5$ is provided across the resistance $R_{14}$, which is bridged by an electrolyte capacitor $C_{12}$, and is applied to the grid across the grid leak resistance, $R_5$.

The amplified output voltage of valve $V_2$ is applied across an anode resistor $R_6$ and, through a coupling capacitor $C_6$, the voltage is also applied across a resistor $R_8$. The voltage across this latter resistor is rectified by suitable means, such as a semi-conductor diode $D_1$.

The screen grid voltage for valve $V_2$ is applied through a resistance $R_7$, and the screen grid is connected to ground through a capacitor $C_5$.

The voltage rectified by the rectifier $D_1$, which is smoothed by the capacitor $C_7$, is used as screen grid voltage for the valves $V_3$ and $V_4$, which together form a normal multivibrator.

The control grid of each valve has a grid leak resistance $R_{11}$ or $R_{12}$ respectively, and is connected, across a capacitor $C_8$ or $C_9$, with the anode of the adjacent valve. The resistances $R_9$ and $R_{10}$ serve as anode resistances. The switching means are dimensioned in such a way that the multivibrator oscillates with its natural frequency as soon as the valves $V_3$ and $V_4$ obtain screen-grid voltage. The natural frequency of the multivibrator is chosen so that it is within the range of the audible frequencies, but far enough away from the network frequency and other interference frequencies. In the present case the frequency of the multivibrator is fixed. By use of adjustable resistances $R_{11}$ and $R_{12}$ (as shown in hatched manner) it can be made variable as desired.

The low frequency generated by the multivibrator is fed to the control grid of an amplifier valve $V_5$ across a double capacitor $C_{10}$. The resistance $R_{13}$ forms a grid leak resistance for this valve.

The primary winding of an output transformer Ü is connected to the anode and to the screen grid of the valve $V_5$. The screen grid of this valve receives the full battery voltage.

A capacitor $C_{11}$ serves to tune this amplifier stage to the multivibrator frequency.

The other winding of the transmitter Ü feeds a loudspeaker 9, which oscillates with the frequency generated by the multivibrator.

A switch $S_1$ in the heating circuit serves to disconnect and to connect the instrument.

To check the instrument, the button 4 is pressed, whereby part of the output voltage of the valve $V_2$ is fed back across a conductor $L_1$, a capacitor $C_{13}$ and a conductor $L_2$ to the control grid of the valve $V_1$. The amplifier, formed by the valves $V_1$ and $V_2$, excites itself hereby and a periodical voltage is generated, which then delivers the screen grid voltage of the instrument during the checking procedure instead of the network alternating voltage which is rectified by the rectifier $D_1$.

In Fig. 3 the complete testing instrument is shown. It has a rod 16 of insulating material provided with a handle 15, which is provided with an insulating plate 17 for the protection of the operator.

On the upper end 18 of the insulating rod 16 a pot-shaped casing base 20 of sheet metal is fixed by means of an easy to disconnect bayonet joint 19. In the bottom of the casing base 20 sound holes 21 are provided.

In the base casing 20, a container 22 is incorporated which carries the complete electrical equipment and which is described in detail hereinafter. In FIG. 3 a container 22 is shown separated from the base 20 and the upper part of the casing 23 to elucidate the drawing.

When the instrument is assembled, base 20 of the case and the upper part 23 enclose the container 22.

A tube 25 of insulating material is connected to the lid 24 of the upper part 23 of the casing, which tube holds, at its upper end by means of a socket 26, a metal point 27 as a testing electrode.

In the interior of the tube 25 a further insulating tube 28 is arranged, which has wire 30 in the longitudinal bore 29. The wire 30 ends at the lower end in a contact 31, into which engages the plug 32 of the container 22.

A space is provided between the upper end of the wire 30 and the bottom 33 of the metal point 27, so that the metal point 27 and the upper end of the wire 30 together form a capacitor of very small capacity.

As shown in FIG. 4, the container 22 consists of three insulation discs 34, 35 and 36, which are held together by means of bolt 37.

The lowest insulation disc 34 serves as a support for the loudspeaker 9, which is arranged in such a way that its sound is directed downward, i.e. towards the operator. For this purpose, the bottom 34 is provided with a hole 48. Furthermore the test key 4 and the switch $S_1$ are placed on the insulation disc 34 so that they protrude through holes of the bottom of the lower part of the casing 20 and thus can be operated from the exterior.

The middle insulating disc 35 carries, essentially, the valves $V_1$, $V_2$, $V_3$, $V_4$, $V_5$, as well as the capacitors and resistors shown in FIG. 2.

On the upper insulation disc 36 the batteries $B_1$ and $B_2$ are arranged. For this purpose a retaining clip 38, to hold the battery is provided ($B_1$, 75 v.), to which holding springs to receive one battery each ($B_2$, 1.5 v.) are fixed, which batteries are arranged with their bottoms upward in standing position, so that their bottoms are electrically connected, by means of contacts 40, with the retaining clip 38.

On the upper side of the retaining clip 38 the insulated metal plug 32 is fixed and is in connection with the wire 30 across the contact 31 when the instrument is mounted, whereby the said wire is laid almost to the bottom 33 of the metal point 27.

When the operator is to control a high voltage line by means of the testing instrument, he first switches on the switch $S_1$ and presses the test key 4. If, then, the loudspeaker 9 gives its signal, the testing device is in order. In order to eliminate errors, which could e.g. be caused by the binding of relays, bells or the like, all the electric means of the new testing instrument work electronically.

If the instrument has been checked by means of the test key 4 and has been found in order, the operator brings the metal point 27 in direct contact with the conductor to be tested. As there are no optical signals whatsoever to be observed, he can observe the contact of the conductor with the point 27 closely. If the loudspeaker 9 gives its signal when the point touches the line, the operator knows with certainty that the conductor is carrying current. If, however, there is no signal from the loudspeaker, the operator removes the metal point 27 from the conductor and again presses the test key 4. If the loudspeaker 9 now gives a signal, the instrument was in order when the metal point 27 was brought into contact with the conductor and the operator knows with certainty that the conductor is not carrying current.

The testing instrument is arranged in such a way, as already described, that it responds only when the metal point 27 is brought into direct contact with a conductor carrying current. Thereby a certain result is also reached when several conductors are arranged parallel to each other and are to be controlled. If a test of a conductor within a distributor station in which there are a number of interferences is to be made, the operator presses first the test key 4 and tunes the tone of the loudspeaker by varying the resistances $R_{11}$ and $R_{12}$ in their frequency until its signal is clearly different from the frequency of the interference noises. In this manner an error in hearing is excluded also in distributor stations. This is the more so as the loudspeaker 9 is directed toward the operator.

Mention must still be made that the new testing instrument can easily be dismantled, i.e. the insulating rod 16 can easily be separated from the casing 20, 22. Thus the instrument can be transported by the operator without any difficulty in a special bag provided for it; it can also be easily carried during the testing procedures, due to its light weight.

Various changes and modifications may be made without departing from the spirit and scope of the present invention and it is intended that such obvious changes and modifications be embraced by the annexed claims.

Having thus described the invention, what is claimed as new and desired to be secured by Letters Patent, is:

1. Testing apparatus for commercial frequency alternating current conductors comprising, in combination, a first relatively elongated and relatively small cross section rod of dielectric material forming a manipulating handle; a second relatively elongated and relatively small cross section tubular rod of dielectric material, a first metal casing section having an end wall secured to the inner end of said first rod and having an open end; a second metal casing section having an end wall secured to the inner end of said second rod and having an open end; said casing sections being interchangeable at the open ends thereof to form a closed casing having a lateral extent somewhat greater than that of said rods; a pointed electrode projecting from the outer end of said second rod; a wire extending through said second rod and electrically coupled to said electrode; a first disengageable connector element connected to the inner end of said wire; a chassis positionable within said casing; an amplifier stage mounted on said chassis; a second disengageable connecting element mounted to project from one end of said chassis and connected to the input of said amplifier stage, said second connector element being disengageably connected to said first connector element when said chassis is positioned within said second casing section; a tunable audio frequency generator mounted on said chassis and having a tunable frequency range differing from said commercial frequency, said audio frequency generator having its input coupled to the output of said amplifier stage; an audio amplifier stage mounted on said chassis and having its input coupled to the output of said audio frequency generator; a loud speaker mounted on said chassis and coupled to the output of said audio amplifier stage; and a self-contained source of potential mounted on said chassis and connected to said first named amplifier stage, said audio frequency generator and said audio amplifier stage; whereby, when said electrode is in galvanic connection with a conductor carrying alternating current at said commercial frequency, an audible tone is produced by said loud speaker differing in frequency from said commercial frequency.

2. Testing apparatus as claimed in claim 1, in which said first casing section is disengageably secured to said first rod for disconnection of said first rod therefrom to provide a compact package for portability.

3. Testing apparatus as claimed in claim 2, in which said loud speaker faces the end wall of said first casing section, and the end wall of said first casing section is apertured for sound transmittal from said loud speaker.

4. Testing apparatus as claimed in claim 1, including a rectifier connected between said first named amplifier stage and said audio frequency generator.

5. Testing apparatus as claimed in claim 1, in which said audio frequency generator comprises a multi-vibrator.

6. Testing apparatus as claimed in claim 1, including a test switch on said chassis which, when closed, completes a feed back circuit for said amplifier stage to provide a test signal for said loud speaker.

7. Testing apparatus as claimed in claim 1, in which the outer end of said wire is spaced from said electrode to form therewith a relatively small value capacitor in series with the input of said first named amplifier stage.

References Cited in the file of this patent

UNITED STATES PATENTS

| | | |
|---|---|---|
| 1,679,397 | Berry | Aug. 7, 1928 |
| 1,684,798 | Iler | Sept. 18, 1928 |
| 1,723,861 | Isshiki | Aug. 6, 1929 |
| 2,488,328 | Rider | Nov. 15, 1949 |
| 2,651,021 | Hays | Sept. 1, 1953 |
| 2,810,068 | Weisz et al. | Oct. 15, 1957 |

FOREIGN PATENTS

| | | |
|---|---|---|
| 648,448 | Great Britain | Jan. 3, 1951 |

OTHER REFERENCES

Krueger: "A Deluxe Signal Tracer," Radio & TV News, January 1951, pp. 64, 65.

Majlinger: "Locating Conductor Faults With Sound Whistler," Bell Laboratories Record, March 1954, pp. 102–107.

Davidson: "Test Instruments Transistorized," Radio-Electronics, December 1956, pp. 60, 61.